(12) United States Patent
Du

(10) Patent No.: US 11,907,164 B2
(45) Date of Patent: Feb. 20, 2024

(54) FILE LOADING METHOD AND APPARATUS, ELECTRONIC DEVICE, AND STORAGE MEDIUM

(71) Applicant: Tencent Technology (Shenzhen) Company Limited, Shenzhen (CN)

(72) Inventor: Liang Du, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 325 days.

(21) Appl. No.: 17/325,112

(22) Filed: May 19, 2021

(65) Prior Publication Data

US 2021/0271640 A1    Sep. 2, 2021

Related U.S. Application Data

(63) Continuation of application No. PCT/CN2020/084218, filed on Apr. 10, 2020.

(30) Foreign Application Priority Data

Apr. 28, 2019 (CN) .......................... 201910349249.6

(51) Int. Cl.
*G06F 16/172* (2019.01)
(52) U.S. Cl.
CPC .................... *G06F 16/172* (2019.01)
(58) Field of Classification Search
CPC .............................. G06F 16/16; G06F 16/172
See application file for complete search history.

(56) References Cited

U.S. PATENT DOCUMENTS

| | | | | |
|---|---|---|---|---|
| 2008/0281884 | A1* | 11/2008 | Subrahmanyam | ........ G06F 8/63 |
| 2016/0191647 | A1 | 6/2016 | Liao | |

FOREIGN PATENT DOCUMENTS

| | | | |
|---|---|---|---|
| CN | 101916302 | A | 12/2010 |
| CN | 102411541 | A | 4/2012 |
| CN | 102799456 | A | 11/2012 |
| CN | 104133782 | A | 11/2014 |
| CN | 104268104 | A | 1/2015 |
| CN | 105573682 | A | 5/2016 |

(Continued)

OTHER PUBLICATIONS

Extended European Search Report, EP20798022.8, dated May 24, 2022, 8 pgs.

(Continued)

*Primary Examiner* — Robert W Beausoliel, Jr.
*Assistant Examiner* — Nirav K Khakhar
(74) *Attorney, Agent, or Firm* — Morgan, Lewis & Bockius LLP

(57) ABSTRACT

This application relates to a file loading method performed at an electronic device, and a non-transitory computer-readable storage medium thereof. The method including: receiving, in response to a user operation, an instruction for loading a target file; determining an associated feature of at least one piece of resource information in the target file; determining a type of the resource information according to the associated feature of the resource information; and loading the resource information by using a loading algorithm corresponding to the type of the resource information.

20 Claims, 5 Drawing Sheets

(56) References Cited

FOREIGN PATENT DOCUMENTS

| | | |
|---|---|---|
| CN | 106997351 A | 8/2017 |
| CN | 107590084 A | 1/2018 |
| CN | 110134650 A | 8/2019 |
| JP | 2011141657 A | 7/2011 |
| WO | WO 2008112770 A2 | 9/2008 |

OTHER PUBLICATIONS

Tencent Technology, ISR, PCT/CN2020/084218, dated Jul. 9, 2020, 2 pgs.
Tencent Technology, WO, PCT/CN2020/084218, dated Jul. 9, 2020, 6 pgs.
Tencent Technology, IPRP, PCT/CN2020/084218, dated Nov. 2, 2021, 7 pgs.

* cited by examiner

301 Detect resource information included in a target file, and split the target file according to associated features of the resource information to obtain two types of resource information 302 Add a cache block quantity control function at an engine layer to enable a logic layer to adjust a value of a maximum quantity of cache blocks to a first quantity or a second quantity according to the cache block quantity control function 303 Dynamically adjust a quantity of cache blocks for the two types of resource information to load corresponding resource information

FIG. 3a

```
<BuildRule Desc="UIPrefab">
          <Dependence Name="UICommon" />
          <Collect Path="UIPrefab" FileNameRegular="UIPrefab/(.+).prefab" ModFilterRegular= "90"
BundleNameFormat="UIPrefab/UIPrefab_" EnableSubFolder="True" />
          <AutoSplit NameFilterRegular="\.(png|psd|cubemap|renderTexture)" GuidFilterRegular="^[0-1]"
DependenceGroupKeyFormat="UIPrefab/UIPrefab_Tex1" />
          <AutoSplit NameFilterRegular="\.(png|psd|cubemap|renderTexture)" GuidFilterRegular="^[2-3]"
DependenceGroupKeyFormat="UIPrefab/UIPrefab_Tex2" />
          <AutoSplit NameFilterRegular="\.(png|psd|cubemap|renderTexture)" GuidFilterRegular="^[4-5]"
DependenceGroupKeyFormat="UIPrefab/UIPrefab_Tex3" />
          <AutoSplit NameFilterRegular="\.(png|psd|cubemap|renderTexture)" GuidFilterRegular="^[6-7]"
DependenceGroupKeyFormat="UIPrefab/UIPrefab_Tex4" />
          <AutoSplit NameFilterRegular="\.(png|psd|cubemap|renderTexture)" GuidFilterRegular="^[8-9]"
DependenceGroupKeyFormat="UIPrefab/UIPrefab_Tex5" />
          <AutoSplit NameFilterRegular="\.(png|psd|cubemap|renderTexture)" GuidFilterRegular="^[a-bA-B]"
DependenceGroupKeyFormat="UIPrefab/UIPrefab_Tex6" />
          <AutoSplit NameFilterRegular="\.(png|psd|cubemap|renderTexture)" GuidFilterRegular="^[c-dC-D]"
DependenceGroupKeyFormat="UIPrefab/UIPrefab_Tex7" />
          <AutoSplit NameFilterRegular="\.(png|psd|cubemap|renderTexture)" GuidFilterRegular="^[e-fE-F]"
DependenceGroupKeyFormat="UIPrefab/UIPrefab_Tex8" />
          <AutoSplit NameFilterRegular="\.(asset|txt|cs|bytes|dll|anim)" GuidFilterRegular="^[0-9a-fA-F]"
DependenceGroupKeyFormat="UIPrefab/UIPrefab_Asset" />
          <AutoSplit NameFilterRegular="\.(mat|shader)" GuidFilterRegular="^[0-9a-fA-F]"
DependenceGroupKeyFormat="UIPrefab/UIPrefab_Mat" />
</BuildRule>
```

FIG. 3b

```
SCRIPT_BINDINGS_EXPORT_DECL
void SCRIPT_CALL_CONVENTION
AssetBundle_CUSTOM_SetMaxCacheCount(ReadOnlyScriptingObjectOfType<AssetBundle> self, int maxCacheCount)
{
    SCRIPTINGAPI_STACK_CHECK(SetMaxCacheCount)
    SCRIPTINGAPI_THREAD_CHECK(SetMaxCacheCount)

AssetBundle& file = *self;
        SetAssetBundleMaxCacheCount(file, maxCacheCount);

}
```

FILE LOADING METHOD AND APPARATUS, ELECTRONIC DEVICE, AND STORAGE MEDIUM

CROSS-REFERENCE TO RELATED APPLICATIONS

This application is a continuation application of PCT Patent Application No. PCT/CN2020/084218, entitled "FILE LOADING METHOD AND APPARATUS, ELECTRONIC DEVICE, AND STORAGE MEDIUM" filed on Apr. 10, 2020, which claims priority to Chinese Patent Application No. 201910349249.6, filed with the State Intellectual Property Office of the People's Republic of China on Apr. 28, 2019, and entitled "FILE LOADING METHOD AND APPARATUS, DEVICE, AND STORAGE MEDIUM", all of which are incorporated herein by reference in their entirety.

FIELD OF THE TECHNOLOGY

This application relates to the field of data processing technologies, and specifically, to a file loading method and apparatus, an electronic device, and a storage medium.

BACKGROUND OF THE DISCLOSURE

With the development of modern hardware technologies, the difference between the performance of hard disks and internal memories becomes increasingly obvious. The hard disk has large capacity but a low loading speed. The internal memory has small capacity but a high loading speed. To make full use of the performance feature of large capacity of the hard disk and a high loading speed of the internal memory, a least recently used (LRU) technology is usually used in the related art to increase the read speed.

However, the method in the related art has an obvious disadvantage. When the structure of a file to be read is excessively complex and data of the file is scattered in a hard disk, the cache rate is greatly reduced, failing to utilize caching to accelerate the loading.

SUMMARY

This application provides a file loading method and apparatus, an electronic device, and a storage medium, to improve the flexibility of file loading. This application is specifically implemented by using the following technical solutions:

According to one aspect, this application provides a file loading method, performed at an electronic device, the method including:
  receiving, in response to a user operation, an instruction for loading a target file;
  determining an associated feature of at least one piece of resource information in the target file;
  determining a type of the resource information according to the associated feature of the resource information; and
  loading the resource information by using a loading algorithm corresponding to the type of the resource information.

According to another aspect, this application provides a file loading apparatus, including:
  a user interface module, configured to receive, in response to a user operation, an instruction for loading a target file;
  a first determining module, configured to determine an associated feature of at least one piece of resource information in the target file;
  a second determining module, configured to determine a type of the resource information according to the associated feature of the resource information; and
  a loading module, configured to load the resource information by using a loading algorithm corresponding to the type of the resource information.

According to another aspect, this application provides an electronic device, including a processor and a memory, the memory storing at least one instruction, the at least one instruction being loaded and executed by the processor to implement the foregoing file loading method.

According to another aspect, this application provides a non-transitory computer-readable storage medium, the storage medium storing at least one instruction, the at least one instruction being loaded and executed by a processor of an electronic device to implement the foregoing file loading method.

BRIEF DESCRIPTION OF THE DRAWINGS

To describe the technical solutions in the embodiments of this application or the related art more clearly, the following briefly describes the accompanying drawings required for describing the embodiments or the related art. Apparently, the accompanying drawings in the following description show only some embodiments of this application, and a person skilled in the art may still derive other drawings from these accompanying drawings without creative efforts.

FIG. 3a is a schematic flowchart of another file loading method according to an embodiment of this application.

FIG. 3b is an exemplary diagram of a configuration file of unpacking an interface resource according to an embodiment of this application.

DESCRIPTION OF EMBODIMENTS

The technical solutions in the embodiments of this application are clearly and completely described below with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

In the specification, claims, and the foregoing accompanying drawings of this application, the terms "first", "second", and so on are intended to distinguish similar objects but do not necessarily indicate a specific order or sequence. The data termed in such a way are interchangeable in proper circumstances, so that the embodiments of this application described herein can be implemented in orders other than the order illustrated or described herein. Moreover, the terms "include", "contain" and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device.

A file loading method in this application is described below. Although this application provides method operation steps described in the embodiments or flowcharts, more or fewer operational steps may be included based on conventional efforts or non-creative efforts. The order of the steps listed in the embodiments is merely one of a plurality of step execution orders, and does not indicate the only execution order. When the method is performed in an actual system or server product, the method may be performed according to method orders shown in the embodiments or the accompanying drawings or performed in parallel (for example, in a parallel processor or multi-thread processing environment).

Figure 1:
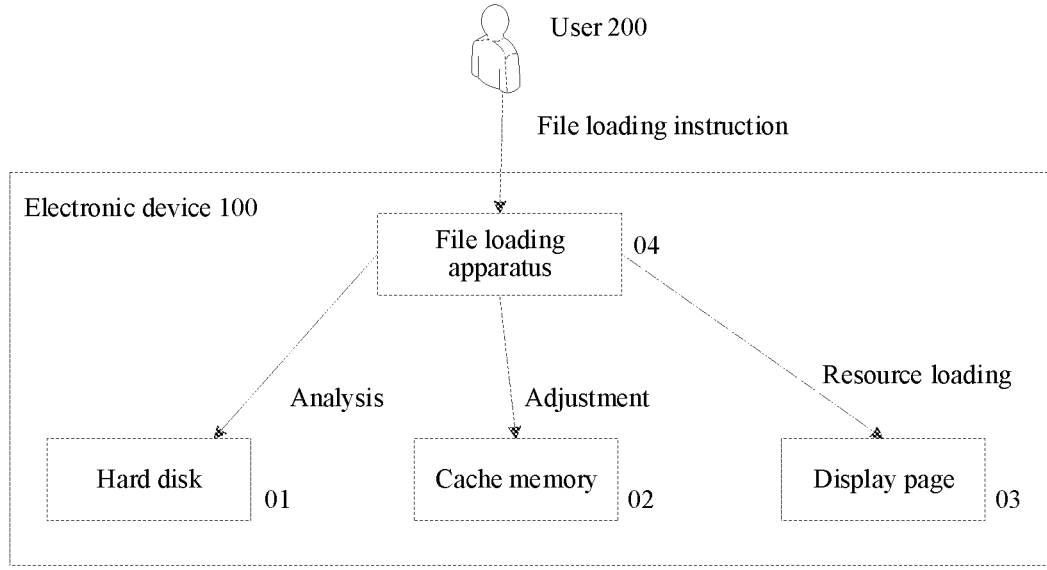
FIG. 1 is a schematic diagram of an application scenario of a file loading method according to an embodiment of this application.

FIG. 1 is a schematic diagram of an actual application scenario of a file loading method according to an embodiment of this application. As shown in FIG. 1, the application scenario includes an electronic device 100 and a user 200. The electronic device 100 specifically includes: a hard disk 01, a cache memory 02, a display page 03, and a file loading apparatus 04. The electronic device 100 includes, but is not limited to, a mobile phone, a tablet computer, a portable notebook computer, a desktop computer, or the like.

Specifically, the hard disk 01 may be a solid state drive, a mechanical hard disk, a solid state hybrid drive, or the like. The hard disk 01 may be disposed in a local device, or may be disposed in a remote device. The hard disk 01 is configured to store a target file (to-be-loaded file).

Specifically, the cache memory 02 may be an internal memory chip on a hard disk controller, or may be a cache memory on a mobile phone chip. The cache memory 02 has an extremely high access speed and is used as a buffer between the hard disk 01 for internal storage and the display page 03 that serves as an external interface.

Specifically, the display page 03 is a page displaying data loaded from the hard disk.

According to the embodiments of this application, the file loading apparatus 04 may be disposed in a game client and is configured to receive a file loading instruction from the user 200 and load various types of to-be-loaded files in the game.

A plurality of rounds of games are usually included in the game client. A single round takes a relatively short time, and a large quantity of resources need to be released and loaded during a scene switch, level loading, interface opening, and the like. In this case, it is necessary to reduce a loading duration of a single round on the basis of maintaining extensive support for player devices. At the same time, enlarging a scale of the game requires multi-person cooperation, and an object-oriented design leads to the decentralization of data, inevitably resulting in a large quantity of files having complex structures during the design and use of the game. Loading durations of these files having complex structures also need to be reduced.

A specific working process for the file loading apparatus 04 to load target files having complex structures includes the following steps:

analyzing types of resources in a resource bundle in the hard disk 01;

adjusting or skipping adjusting cache blocks in the cache memory 02 according to the types of the resources;

respectively loading the resources by using the adjusted cache blocks or the unadjusted cache blocks; and displaying the loaded resources on the display page 03.

Figure 2:
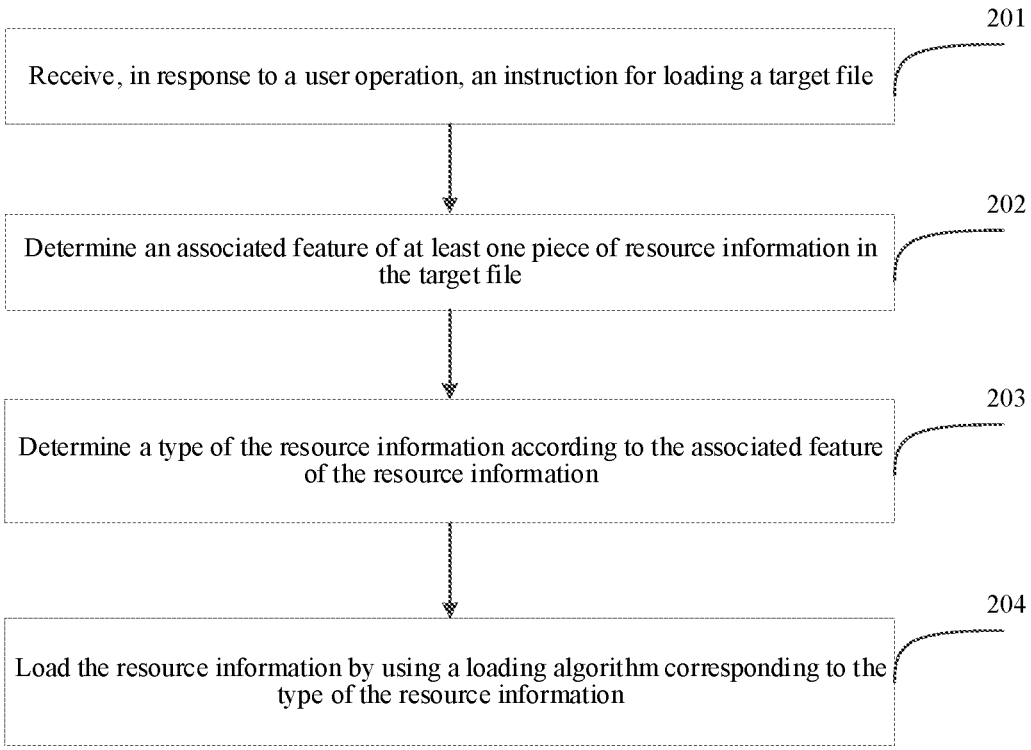
FIG. 2 is a schematic flowchart of a file loading method according to an embodiment of this application.

FIG. 2 is a schematic flowchart of a file loading method according to an embodiment of this application. The method is applied to the electronic device 100 or the file loading apparatus 04 shown in FIG. 1. As shown in FIG. 2, the method specifically includes the following steps:

S201. Receive, in response to a user operation, an instruction for loading a target file.

In this embodiment of this application, when an electronic device receives the user operation, it is determined that an instruction for loading the target file is received. The target file refers to a to-be-loaded file having a complex structure. The target file includes at least one piece of resource information, and types of the resource information may be different.

In an actual application, the target file may be a to-be-loaded file in a game, including to-be-loaded files during input or output operations such as a scene switch, level loading, and interface opening. For example, during an automobile racing game, when a user switches a scene, a data file of a new scene needs to be loaded. In this case, the user inputs a click operation by using a mouse or slides on a screen to determine that a target file in a new scene needs to be loaded.

S202. Determine an associated feature of at least one piece of resource information in the target file.

In this embodiment of this specification, the target file is stored in a hard disk. When the target file needs to be loaded, the target file is read from the hard disk and cached into a buffer of an internal memory. The determining an associated feature of at least one piece of resource information in the target file may include: obtaining an amount of internal memory occupied by the resource information; and using the amount of internal memory occupied by the resource information as the associated feature of the resource information. The amount of internal memory occupied by the resource information may be indicated by using a quantity of cache blocks in the internal memory. The cache block refers to a segment of internal memory that is of a designated size and consecutive.

In addition, the determining an associated feature of at least one piece of resource information in the target file may further include: obtaining a read frequency of reading the resource information in an internal memory; and using the read frequency as the associated feature of the resource information.

The amount of internal memory occupied by the resource information and the read frequency are important parameters in the storage process and reading and writing process of the resource information, and also affect the efficiency of loading the resource information. Therefore, the amount of the occupied internal memory or the read frequency is used as the associated feature for determining a type of the resource information.

S203. Determine a type of the resource information according to the associated feature of the resource information.

Specifically, the determining a type of the resource information according to the associated feature of the resource information may include: determining the type of the resource information according to the amount of the occupied internal memory, the type of the resource information including a first type and a second type, an amount of internal memory occupied by resource information of the first type being less than an amount of internal memory occupied by resource information of the second type.

In addition, the determining a type of the resource information according to the associated feature of the resource information may alternatively include: determining the type of the resource information according to a magnitude of the read frequency, the type of the resource information including a first type and a second type, a read frequency of resource information of the first type being greater than a read frequency of resource information of the second type.

S204. Load the resource information by using a loading algorithm corresponding to the type of the resource information.

A maximum quantity of cache blocks in the internal memory is preset as a first quantity before the quantity of cache blocks is adjusted. For example, the first quantity is two.

Specifically, when the type of the resource information is the first type, the loading the resource information by using a loading algorithm corresponding to the type of the resource information includes: increasing the quantity of cache blocks from the first quantity to a second quantity; and loading the resource information of the first type based on the second quantity of cache blocks.

Further, the quantity of cache blocks is set from the second quantity back to the first quantity after the loading of the resource information of the first type is completed.

In this embodiment of this application, by temporarily increasing the quantity of cache blocks available for the resource information, the efficiency of loading the resource information is improved. After the loading of the resource information is completed, the quantity of cache blocks is set back, which releases buffer space, so that the loading of other resource information by using this method is not affected.

In addition, when the type of the resource information is the second type, the loading the resource information by using a loading algorithm corresponding to the type of the resource information includes: loading the resource information of the second type based on the first quantity of cache blocks.

The file loading method described in this embodiment of this application is mainly for a file having a complex structure. Through an analysis of an associated feature of resource information in the file having a complex structure, the resource information is classified according to a result of the analysis, and then corresponding loading methods are designed and used according to different types of the resource information. By using the technology described in this embodiment of this application, even on a low-end mobile device, a file can be loaded at an extremely high speed while fully saving the space of the internal memory, so that loading time can be greatly saved during a plurality of types of input or output operations such as a scene switch, level loading, and interface opening.

The file loading method in this embodiment of this application is further described below by using an example in which an AssetBundle resource bundle is used as the target file. AssetBundle is a technology of resource packaging and compression and is used for managing various types of Assets resources. FIG. 3a is a schematic flowchart of another file loading method according to an embodiment of this application. The method may be applied to the electronic device 100 or the file loading apparatus 04 shown in FIG. 1. As shown in FIG. 3a, the method includes the following steps:

Step 301. Detect resource information included in a target file, and split the target file according to associated features of the resource information to obtain two types of resource information.

Specifically, an AssetBundle resource bundle including a file having a complex structure is detected, and all resources in the resource bundle may be classified into two types, namely type A and type B, according to structure features and amounts of occupied internal memory. An A-type resource refers to a resource having a complex structure but occupying a relatively small amount of internal memory, for example, an interface prefab. The characteristic of such a type of resource is that a cache block is repeatedly loaded during a loading process.

A B-type resource refers to a resource having a simple structure but occupying a relatively large amount of internal memory and may include various types of maps, models, sounds and even scene resources. Such a type of resource is of a sample structure, and a case that a cache block is repeatedly loaded during a loading process seldom occurs.

By using an interface resource as an example, FIG. 3b is an exemplary diagram of a configuration file of unpacking an interface resource. According to the configuration file shown in FIG. 3b, the interface resource is split into A-type resources and B-type resources. The A-type resources include an interface prefab "UIPrefab" that is split into a total of 90 portions. The A-type resources further include materials "mat", shaders, and the like. The B-type resources correspond to maps. File sizes of the A-type resources and the B-type resources are required to be less than 10 MB, so as to avoid a case that the resource files are mistaken for large files and thus deleted during system cleanup performed by an operating system.

In this embodiment of this application, cache hit rates of the A-type resources and the B-type resources are different. When designated data needs to be accessed, if the data has been cached in the internal memory, it is referred to as a hit. If the data is not cached in the internal memory, the data needs to be read from the hard disk and cached in the internal memory, which is referred to as a miss. A hit rate=a quantity of hits/(the quantity of hits+a quantity of misses). The cache hit rate is one of important factors for determining the cache efficiency.

Specifically, for the A-type resources, a size of a single resource file is smaller than a total size of cache blocks due to a quite low cache hit rate. In this example, a total size of the A-type resources is about 100 MB. Because a maximum quantity of cache blocks is set to 16, and a single cache block is 128 KB, it is expected that a size of a resource file is not greater than a total size of cache blocks (128 KB*16=2 MB). Therefore, the interface prefabs are divided into 90 files with an average of 1.1 MB each. Material and shader resources are combined into one file, other resources (including text, byte arrays, animations), and the like are combined into one file. An amount of internal memory occupied by a single file of the A-type resources is less than 2 MB. During specific application, a quantity of files of the A-type resources may be appropriately divided based on a resource status of a project.

For the B-type resources, a total size of cache blocks is less associated with a total size of the resources due to a high cache hit rate. In this embodiment, the B-type resources are mainly maps quoted by an interface. A total size of the maps quoted by the interface is about 60 MB. A globally unique identifier (GUID) is generated for each resource, and then all map resources are uniformly divided into eight files according to the GUIDs, a size of each file being 7.5 MB.

A total size of the A-type resources and the B-type resources are a sum of art resources that can be used and is associated with a specific application project. Quantities of resources used in different projects are different, and a larger project requires a larger quantity of resources.

Step 302. Add a cache block quantity control function at an engine layer to enable a logic layer to adjust a value of a maximum quantity of cache blocks to a first quantity or a second quantity according to the cache block quantity control function.

Figures 4, 5:
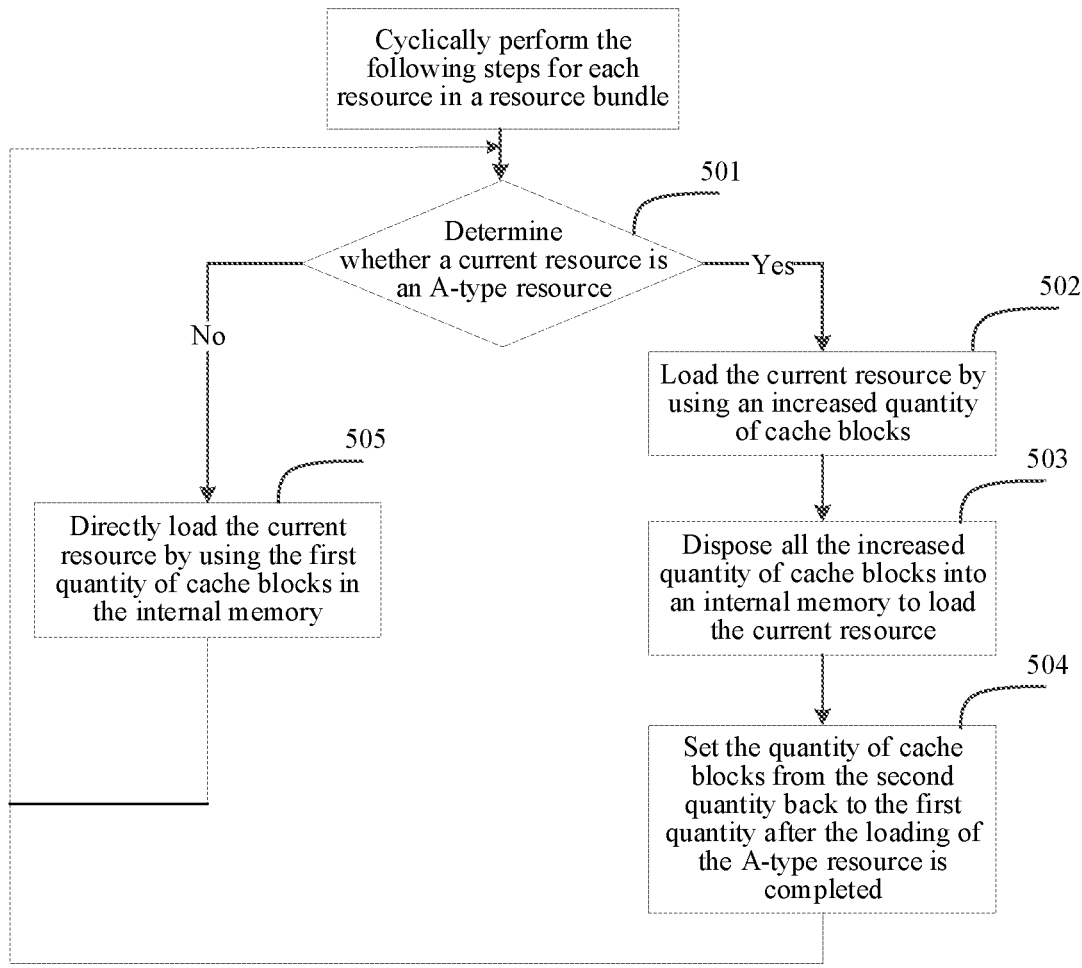
FIG. 4 is an exemplary diagram of an interface of dynamically adjusting a size of a cache block according to an embodiment of this application.
FIG. 5 is a schematic flowchart of still another file loading method according to an embodiment of this application.

FIG. 4 is an exemplary diagram of an interface of dynamically adjusting a size of a cache block according to an embodiment of this application.

By setting the cache block quantity control function SetAssetBundleMaxCacheCount( ) in the engine layer that implements underlying functions, the logic layer that implements functions of determination, call, and control can easily adjust the maximum quantity of cache blocks.

For cache blocks corresponding to a single AssetBundle, a dictionary may be used for management in code implementation, so as to quickly add or delete a cache block.

Step 303. Dynamically adjust a quantity of cache blocks for the two types of resource information to load corresponding resource information.

According to the foregoing descriptions of step 205, the maximum quantity of cache blocks in the internal memory is preset as the first quantity. For the A-type resources, the quantity of cache blocks is increased from the first quantity to the second quantity, and the A-type resources are loaded based on the second quantity of cache blocks. The B-type resources are loaded based on the first quantity of cache blocks.

FIG. 5 is a schematic flowchart of still another file loading method according to an embodiment of this application. The method may be applied to the electronic device 100 or the file loading apparatus 04 shown in FIG. 1. As shown in FIG. 5, a target file is an AssetBundle resource bundle. The following steps are cyclically performed for each resource in the resource bundle.

Step 501. Determine whether a current resource is an A-type resource. If the current resource is the A-type resource, steps 502 to 504 are performed, and if the current resource is not the A-type resource, step 505 is performed.

Step 502. Load, if the current resource is the A-type resource, the current resource by using an increased quantity of cache blocks.

For example, a preset maximum quantity of cache blocks, that is, a first quantity is two, and occupies 256 KB internal memory. The quantity of cache blocks is temporarily increased to a second quantity, which is 16, and occupies 2 MB internal memory at most.

Step 503. Dispose all the increased quantity of cache blocks into an internal memory to load the current resource.

There is no cache block moved out, and therefore, a cache hit rate reaches a theoretical maximum value.

Step 504. Set the quantity of cache blocks from the second quantity back to the first quantity after the loading of the A-type resource is completed.

In this step, when the loading of the A-type resource is completed, cache blocks additionally loaded due to the temporarily increased quantity of cache blocks may be moved out immediately. In a process of loading a plurality of A-type resources, when an A-type resource is loaded, additional cache blocks occupied by the resource are released immediately, and therefore, even if the plurality of A-type resources need to be loaded sequentially, an amount of internal memory occupied by the plurality of A-type resources is not high.

Step 505. Directly load, if the current resource is not the A-type resource, the current resource by using the first quantity of cache blocks in the internal memory.

If the current resource is not the A-type resource, the current resource is a B-type resource which occupies a larger space and has a normal cache hit rate. In this case, the current resource is loaded only by using the preset first quantity of cache blocks, for example, two cache blocks.

Through the foregoing embodiment, the maximum quantity of cache blocks is dynamically adjusted during the loading of the A-type resource, so that when the plurality of A-type resources in AssetBundle are loaded, a peak value of the internal memory may increase by 1.75 MB at most (that is, 16 cache blocks*128 KB-2 cache blocks*128 KB) compared with that in existing solutions, and a theoretically highest cache hit rate is achieved by occupying the extra 1.75 MB of the internal memory, which greatly accelerates the loading speed of files having complex structures.

When this technical solution is applied to a game scene, the load data of a single round has been improved significantly. At the same time, due to a reduction of loading time, a dropping rate caused by time-consuming loading can be lowered.

For ease of comparison, an LRU technology in the existing solutions is used for testing. That is, when a limited internal memory space is full of data, data that has not been accessed for the longest time is eliminated.

By using a file having a complex structure in the AssetBundle as an example, a size of each cache block is set to 128 KB, and a designated resource A is read. The resource A is distributed in a space with a size of 597 cache blocks on a hard disk. 3597 times of cache block reading are requested (due to cases of reading a certain cache block repeatedly, the quantity of times of cache block reading requested >> an actual quantity of occupied cache blocks). The table below shows a test result of a cache hit rate:

TABLE 1

Test result of cache hit rate

| Test | Maximum quantity of cache blocks requested in the AssetBundle | Amount of occupied internal memory | Quantity of times of reading cache blocks | Hit rate |
|---|---|---|---|---|
| Test 1 | 1 | 128 KB | 3563 | 0.90% |
| Test 2 | 2 | 256 KB | 3560 | 1.00% |
| Test 3 | 8 | 1 MB | 3508 | 2.40% |
| Test 4 | 128 | 16 MB | 2351 | 36.60% |
| Test 5 | 512 | 64 MB | 597 | 83.40% |
| Test 6 | 1024 | 128 MB | 597 | 83.40% |

From Table 1, it can be seen that if the maximum quantity of cache blocks is set to 2, a hit rate is only 0.9%, and if the maximum quantity of cache blocks is set to 512, an amount of occupied internal memory is 64 MB. That is, if the LRU technology is used, for a file having a complex structure, either the hit rate is low and loading time is long, or an extremely large amount of internal memory is occupied, which is not friendly to a device with low internal memory.

In terms of performance, the advantages of low internal memory occupation and high hit rate cannot be achieved at the same time.

By using an example in which a target file is loaded in a game client, the following is a comparison table of loading time of a single round on two types of intelligent terminals by using the technical solutions described in the embodiments of this application and the existing LRU solution. A terminal 1 is a mid-end machine, and a terminal 2 is a low-end machine:

TABLE 2

Loading time of single round on Terminal 1 (measured in seconds)

| Map in single round | Loading time when standard LRU is used | Loading time when the present technical solution is used | Reduction in loading time |
| --- | --- | --- | --- |
| Madagascar | 15.43 | 10.43 | 5.00 |
| Chinatown | 14.32 | 9.26 | 5.06 |
| City 11 | 15.03 | 9.93 | 5.10 |

TABLE 3

Loading time of single round on Terminal 2 (measured in seconds)

| Map in single round | Loading time when standard LRU is used | Loading time when the present technical solution is used | Reduction in loading time |
| --- | --- | --- | --- |
| Madagascar | 32.53 | 25.83 | 6.70 |
| Chinatown | 30.06 | 23.99 | 6.07 |
| City 11 | 31.96 | 24.32 | 7.64 |

Figure 6:
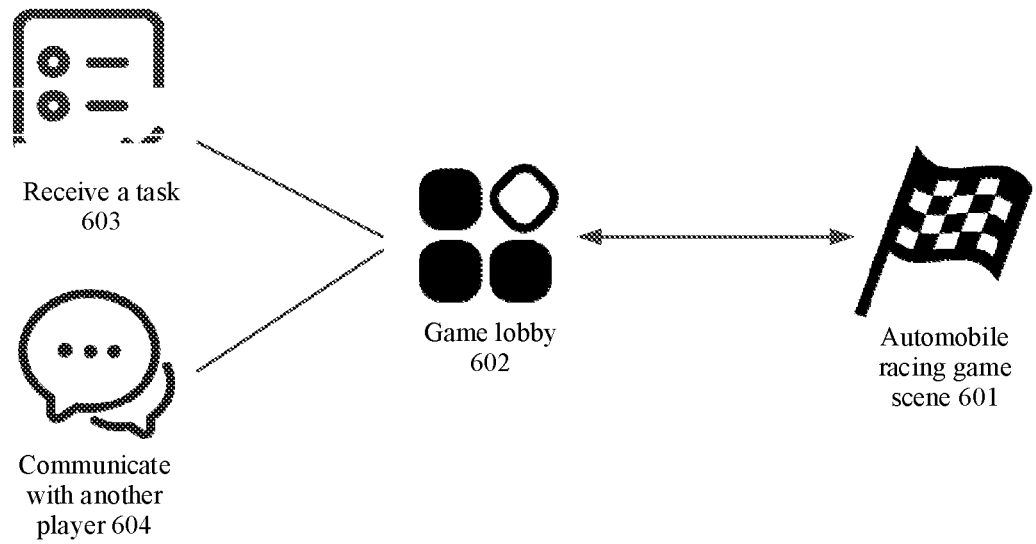
FIG. 6 is an exemplary diagram of an application background of a file loading method in an automobile racing game according to an embodiment of this application.

FIG. 6 provides an exemplary diagram of an application background of a file loading method in an automobile racing game according to an embodiment of this application.

When playing an automobile racing game, a player often needs to switch between a game lobby 602 and an automobile racing game scene 601. In the automobile racing game scene 601, the player needs to concentrate on driving a racing car, and after finishing a race on a track set in the game, the player needs to return to the game lobby 602 to receive a new automobile racing mission 603 and communicate with another player 604, and during the switching, various types of page resources need to be loaded frequently. Therefore, by using the file loading method in this application, the waiting time of a user during a scene switch or the like can be greatly reduced, thereby improving the user experience and strengthening the user's stickiness to the game.

Figure 7:
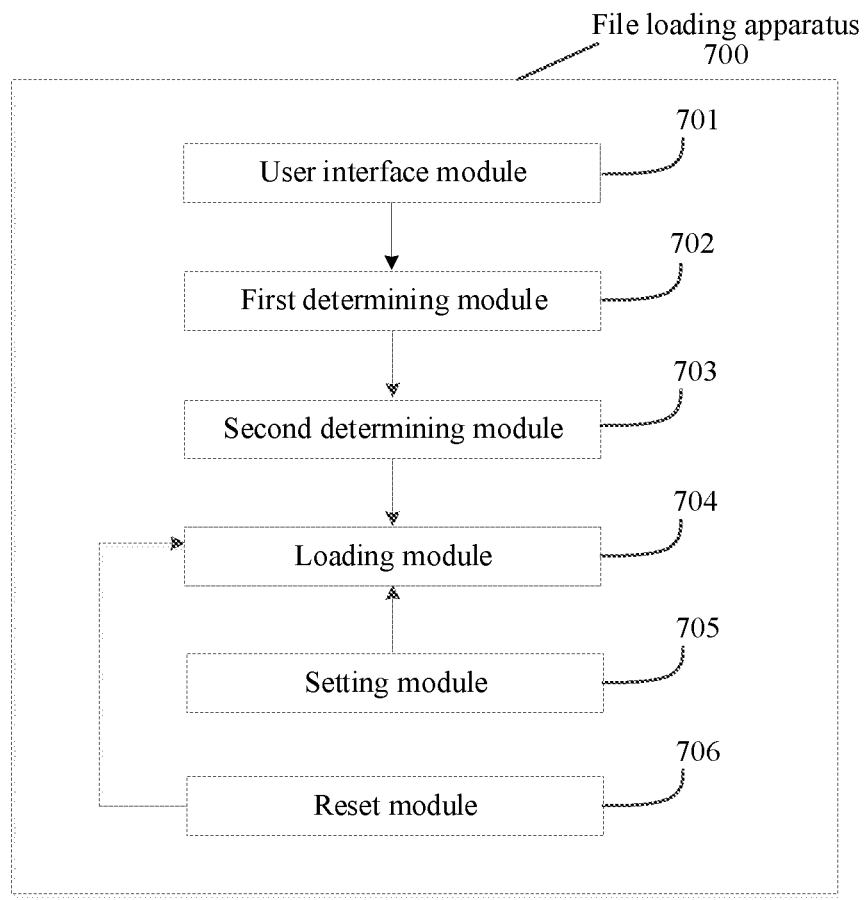
FIG. 7 is a schematic structural diagram of a file loading apparatus according to an embodiment of this application.

An embodiment of this application further provides a file loading apparatus. The apparatus may be applied to the electronic device 100 shown in FIG. 1. As shown in FIG. 7, the apparatus 700 includes:

a user interface module 701, configured to receive, in response to a user operation, an instruction for loading a target file;

a first determining module 702, configured to determine an associated feature of at least one piece of resource information in the target file;

a second determining module 703, configured to determine a type of the resource information according to the associated feature of the resource information; and a loading module 704, configured to load the resource information by using a loading algorithm corresponding to the type of the resource information.

In an embodiment, the first determining module 702 is configured to obtain an amount of internal memory occupied by the resource information; and use the amount of internal memory occupied by the resource information as the associated feature of the resource information.

Further, the second determining module 703 is configured to determine the type of the resource information according to the amount of the occupied internal memory, the type of the resource information including a first type and a second type, an amount of internal memory occupied by resource information of the first type being less than an amount of internal memory occupied by resource information of the second type.

In an embodiment, the first determining module 702 is configured to obtain a read frequency of reading the resource information in an internal memory; and use the read frequency as the associated feature of the resource information.

Further, the second determining module 703 is configured to determine the type of the resource information according to a magnitude of the read frequency, the type of the resource information including a first type and a second type, a read frequency of resource information of the first type being greater than a read frequency of resource information of the second type.

In an embodiment, the apparatus 700 further includes:
a setting module 705, configured to preset a maximum quantity of cache blocks in the internal memory as a first quantity.

Correspondingly, when the type of the resource information is the first type, the loading module 704 is configured to increase the quantity of cache blocks from the first quantity to a second quantity; and load the resource information of the first type based on the second quantity of cache blocks.

In an embodiment, the apparatus 700 further includes:
a reset module 706, configured to set the quantity of cache blocks from the second quantity back to the first quantity after the loading of the resource information of the first type is completed.

In an embodiment, the loading module 704 is configured to add a cache block quantity control function at an engine layer to enable a logic layer to adjust a value of the maximum quantity of cache blocks to the first quantity or the second quantity according to the cache block quantity control function.

In an embodiment, the apparatus 700 further includes:
a setting module 705, configured to preset a maximum quantity of cache blocks in the internal memory as a first quantity.

Correspondingly, when the type of the resource information is the second type, the loading module 704 is configured to load the resource information of the second type based on the first quantity of cache blocks. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 8:
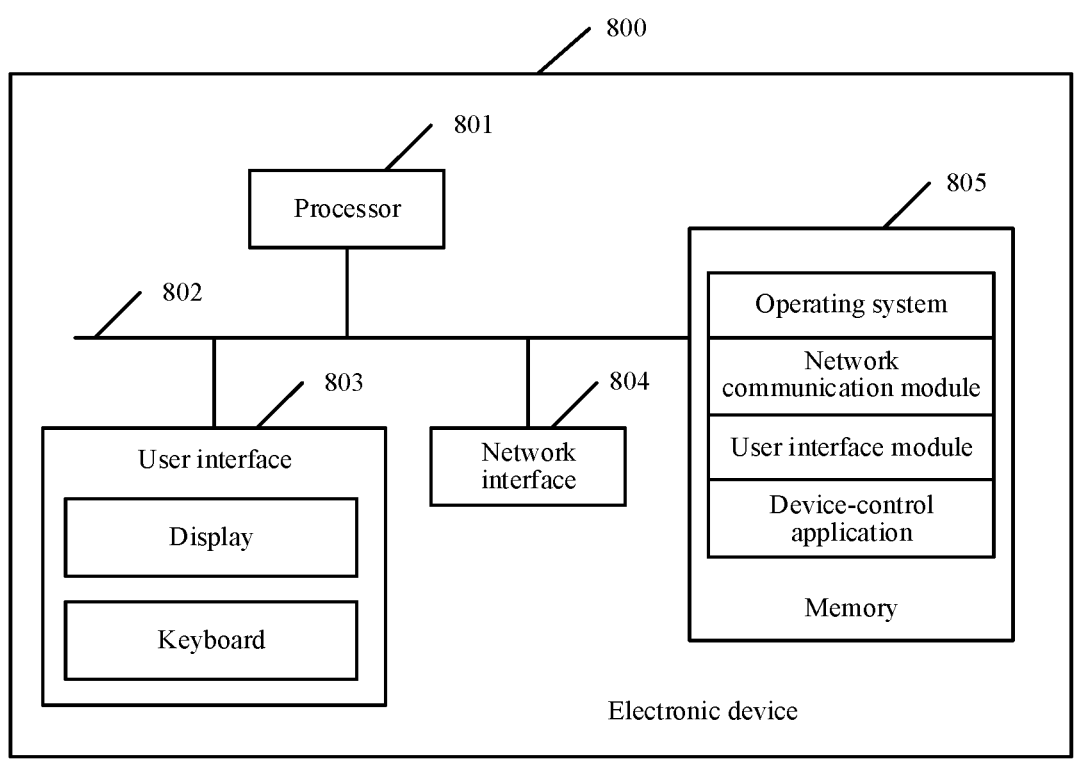
FIG. 8 is a schematic structural diagram of an electronic device according to an embodiment of this application.

This application provides an electronic device, including a processor and a memory, the memory storing at least one instruction, at least one program, a code set or an instruction set, the at least one instruction, the at least one program, the code set or the instruction set being loaded and executed by the processor to implement the foregoing file loading method. As shown in FIG. 8, the electronic device 800 may be the electronic device 100 shown in FIG. 1, and specifically include: a processor 801, a network interface 804, and a memory 805, as well as a user interface 803 and at least one communication bus 802. The communication bus 802 is configured to implement connection and communication between the components. The user interface 803 may include a display, a keyboard, and optionally, the user interface 803 may further include a standard wired interface and a standard wireless interface. In some embodiments, the network interface 804 may include a standard wired interface and a standard wireless interface (such as a Wi-Fi interface). The memory 805 may be a high-speed random access memory (RAM), or may be a non-volatile memory, for example, at least one magnetic disk memory. In some embodiments, the memory 805 may be at least one storage apparatus that is located far away from the foregoing processor 801. As shown in FIG. 8, the memory 805, which is used as a computer storage medium, may include an operating system, a network communication module, a user interface module, and a device control application.

In the electronic device 800 shown in FIG. 8, the network interface 804 may provide a network communication function, and the user interface 803 is mainly configured to provide an input interface for a user. The processor 801 may be configured to invoke a device-control application stored in the memory 805, to implement the descriptions of the file loading method in any one of the foregoing corresponding embodiments According to another aspect, this application provides a computer-readable storage medium, the storage medium storing at least one instruction, at least one program, a code set or an instruction set, the at least one instruction, the at least one program, the code set or the instruction set being loaded and executed by a processor to implement the foregoing file loading method.

In this embodiment of this application, the memory may be configured to store a software program and module. The processor runs the software program and module stored in the memory, to implement various functional applications and data processing. The memory may mainly include a program storage area and a data storage area. The program storage area may store an operating system, an application required by a function, and the like. The data storage area may store data created according to use of the device, and the like. In addition, the memory may include a high-speed random access memory, and may also include a non-volatile memory, such as at least one magnetic disk storage device, a flash memory, or another volatile solid-state storage device. Correspondingly, the memory may further include a memory controller, so as to provide access of the processor to the memory.

From the foregoing embodiments of the file loading method and apparatus, the electronic device, and the storage medium provided in this application, it can be seen that, the file loading method described in this application is mainly for a file having a complex structure. Through an analysis of an associated feature of resource information in the file having a complex structure, the resource information is classified according to a result of the analysis, and then corresponding loading methods are designed and used according to different types of the resource information. By using the technology described in this application, even on a low-end mobile device, a file can be loaded at an extremely high speed while fully saving the space of the internal memory, so that loading time can be greatly saved during a plurality of types of input or output operations such as a scene switch, level loading, and interface opening.

In addition, the technical solutions for low internal memory consumption and fast reading of a file having a complex structure provided in this application can widely support mobile devices of various specifications and does not generate additional performance requirements for the devices, and at the same time, a load speed can be greatly improved and waiting time is reduced, thereby providing good loading experience for a user.

The sequence of the foregoing embodiments of this application are merely for description purpose but do not represent the preference among the embodiments. Specific embodiments of this application are described above. Other embodiments fall within the scope of the appended claims. In some cases, the actions or steps recorded in the claims may be performed in sequences different from those in the embodiments and an expected result may still be achieved. In addition, the processes depicted in the accompanying drawings is not necessarily performed in the specific order or successively to achieve an expected result. In some implementations, multitasking and parallel processing may be feasible or beneficial.

The embodiments of this application are all described in a progressive manner, for same or similar parts in the embodiments, reference may be made to such embodiments, and descriptions of each embodiment focus on a difference from other embodiments. Especially, apparatus, system, and server embodiments are basically similar to a method embodiment, and therefore are described briefly; for related parts, reference may be made to partial descriptions in the method embodiment.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A file loading method performed at an electronic device, the method comprising:
   receiving, in response to a user operation, an instruction for loading a target file;
   determining an associated feature of at least one piece of resource information in the target file, wherein the associated feature indicates an amount of internal memory occupied by the resource information;
   determining a type of the resource information according to the associated feature of the resource information; and
   loading the resource information by using a loading algorithm corresponding to the type of the resource information.

2. The method according to claim 1, further comprising determining the loading algorithm based on the type of the resource information.

3. The method according to claim 1, wherein the determining a type of the resource information according to the associated feature of the resource information comprises:
- determining the type of the resource information according to the amount of the occupied internal memory, the type of the resource information comprising a first type and a second type, an amount of internal memory occupied by resource information of the first type being less than an amount of internal memory occupied by resource information of the second type.

4. The method according to claim 1, wherein the determining an associated feature of at least one piece of resource information in the target file comprises:
- obtaining a read frequency of reading the resource information in an internal memory; and
- using the read frequency as the associated feature of the resource information.

5. The method according to claim 4, wherein the determining a type of the resource information according to the associated feature of the resource information comprises:
- determining the type of the resource information according to a magnitude of the read frequency, the type of the resource information comprising a first type and a second type, a read frequency of resource information of the first type being greater than a read frequency of resource information of the second type.

6. The method according to claim 1, further comprising:
- presetting a maximum quantity of cache blocks in the internal memory as a first quantity, wherein
- when the type of the resource information is a first type, the loading the resource information by using a loading algorithm corresponding to the type of the resource information comprises:
  - increasing the quantity of cache blocks from the first quantity to a second quantity; and
  - loading the resource information of the first type based on the second quantity of cache blocks; and
- when the type of the resource information is the second type, the loading the resource information by using a loading algorithm corresponding to the type of the resource information comprises:
  - loading the resource information of the second type based on the first quantity of cache blocks.

7. The method according to claim 6, further comprising:
- setting the quantity of cache blocks from the second quantity back to the first quantity after the loading of the resource information of the first type is completed.

8. The method according to claim 6, wherein the increasing the quantity of cache blocks from the first quantity to a second quantity comprises:
- adding a cache block quantity control function at an engine layer to enable a logic layer to adjust a value of the maximum quantity of cache blocks to the first quantity or the second quantity according to the cache block quantity control function.

9. An electronic device, comprising a processor and a memory, the memory storing at least one instruction, the at least one instruction being loaded and executed by the processor to perform a plurality of operations including:
- receiving, in response to a user operation, an instruction for loading a target file;
- determining an associated feature of at least one piece of resource information in the target file, wherein the associated feature indicates an amount of internal memory occupied by the resource information;
- determining a type of the resource information according to the associated feature of the resource information; and
- loading the resource information by using a loading algorithm corresponding to the type of the resource information.

10. The electronic device according to claim 9, wherein the loading algorithm is determined based on the type of the resource information.

11. The electronic device according to claim 9, wherein the determining a type of the resource information according to the associated feature of the resource information comprises:
- determining the type of the resource information according to the amount of the occupied internal memory, the type of the resource information comprising a first type and a second type, an amount of internal memory occupied by resource information of the first type being less than an amount of internal memory occupied by resource information of the second type.

12. The electronic device according to claim 9, wherein the determining an associated feature of at least one piece of resource information in the target file comprises:
- obtaining a read frequency of reading the resource information in an internal memory; and
- using the read frequency as the associated feature of the resource information.

13. The electronic device according to claim 12, wherein the determining a type of the resource information according to the associated feature of the resource information comprises:
- determining the type of the resource information according to a magnitude of the read frequency, the type of the resource information comprising a first type and a second type, a read frequency of resource information of the first type being greater than a read frequency of resource information of the second type.

14. The electronic device according to claim 9, wherein the plurality of operations further comprise:
- presetting a maximum quantity of cache blocks in the internal memory as a first quantity, wherein
- when the type of the resource information is a first type, the loading the resource information by using a loading algorithm corresponding to the type of the resource information comprises:
  - increasing the quantity of cache blocks from the first quantity to a second quantity; and
  - loading the resource information of the first type based on the second quantity of cache blocks; and
- when the type of the resource information is the second type, the loading the resource information by using a loading algorithm corresponding to the type of the resource information comprises:
  - loading the resource information of the second type based on the first quantity of cache blocks.

15. The electronic device according to claim 14, wherein the plurality of operations further comprise:
- setting the quantity of cache blocks from the second quantity back to the first quantity after the loading of the resource information of the first type is completed.

16. The electronic device according to claim 14, wherein the increasing the quantity of cache blocks from the first quantity to a second quantity comprises:
- adding a cache block quantity control function at an engine layer to enable a logic layer to adjust a value of the maximum quantity of cache blocks to the first quantity or the second quantity according to the cache block quantity control function.

17. A non-transitory computer-readable storage medium, the storage medium storing at least one instruction, the at least one instruction being loaded and executed by a processor of an electronic device to perform a plurality of operations including:
  receiving, in response to a user operation, an instruction for loading a target file;
  determining an associated feature of at least one piece of resource information in the target file, wherein the associated feature indicates an amount of internal memory occupied by the resource information;
  determining a type of the resource information according to the associated feature of the resource information; and
  loading the resource information by using a loading algorithm corresponding to the type of the resource information.

18. The non-transitory computer-readable storage medium according to claim 17, wherein the plurality of operations further comprise:
  presetting a maximum quantity of cache blocks in the internal memory as a first quantity, wherein
  when the type of the resource information is a first type, the loading the resource information by using a loading algorithm corresponding to the type of the resource information comprises:
    increasing the quantity of cache blocks from the first quantity to a second quantity; and
    loading the resource information of the first type based on the second quantity of cache blocks; and
  when the type of the resource information is the second type, the loading the resource information by using a loading algorithm corresponding to the type of the resource information comprises:
    loading the resource information of the second type based on the first quantity of cache blocks.

19. The non-transitory computer-readable storage medium according to claim 18, wherein the plurality of operations further comprise:
  setting the quantity of cache blocks from the second quantity back to the first quantity after the loading of the resource information of the first type is completed.

20. The non-transitory computer-readable storage medium according to claim 18, wherein the increasing the quantity of cache blocks from the first quantity to a second quantity comprises:
  adding a cache block quantity control function at an engine layer to enable a logic layer to adjust a value of the maximum quantity of cache blocks to the first quantity or the second quantity according to the cache block quantity control function.

\* \* \* \* \*